L. H. NASH.
WATER METER.
APPLICATION FILED JAN. 5, 1910.
1,033,610.
Patented July 23, 1912.
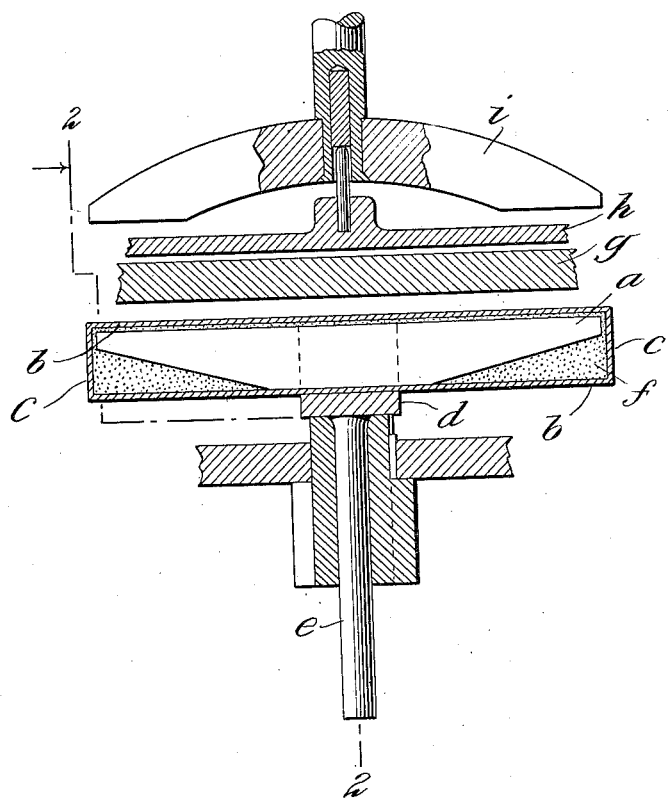
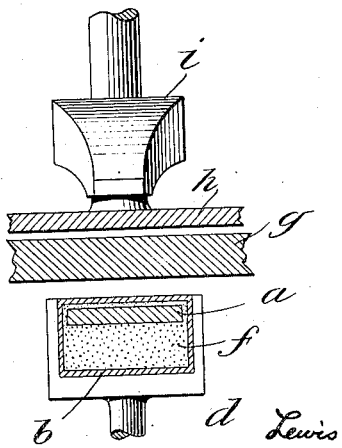

UNITED STATES PATENT OFFICE.

LEWIS HALLOCK NASH, OF SOUTH NORWALK, CONNECTICUT.

WATER-METER.

1,033,610.  Specification of Letters Patent.  Patented July 23, 1912.

Application filed January 5, 1910. Serial No. 536,526.

*To all whom it may concern:*

Be it known that I, LEWIS HALLOCK NASH, a citizen of the United States, residing at South Norwalk, in the county of Fairfield and State of Connecticut, have invented certain new and useful Improvements in Water-Meters, of which the following is a specification.

My invention relates to new and useful improvements in water meters of the general character or type in which the connection between the part or parts acted upon by the water is made to the registering mechanism by means of a magnet.

The object of the invention is to protect the magnet against corrosion where such magnet is used in the water meter under water and subjected to the action of the elements.

Numerous attempts have been made to provide means for effectually preventing the corrosion of the magnet, and I have found that plating with a magnetic deposit, tinning and all similar methods fail to accomplish the desired result. After many tests I have found that the construction hereinafter described serves as a perfect protection of the magnet against corrosion.

The invention consists in the construction and arrangement of parts to be fully described hereinafter and the novelty of which will be particularly pointed out and distinctly claimed.

I have fully and clearly illustrated my invention in the accompanying drawings to be taken as a part of this specification and wherein:—

Figure 1 is a view in elevation partly in section of a magnet having my invention applied thereto and the associated parts of a water meter, other parts being omitted for purposes of clearness. Fig. 2 is a section on the line 2—2 of Fig. 1.

Referring to the drawings by characters of reference, $a$ designates a magnet employed for connecting the parts of the meter acted upon or driven by the water to the registering mechanism, said parts and mechanism being in part omitted for the purposes of clearness, and as forming no part of the present invention. This magnet is placed within a drawn tube $b$ made of copper or other suitable impervious material. This tube is folded over at its ends as at $c$ and sealed so as to completely inclose the magnet and prevent access of the elements to the interior of the casing. The casing with its inclosed magnet is mounted upon a bearing $d$, which does not perforate the casing but holds it to to be revolved by the spindle $e$ which is acted upon by the meter mechanism, not shown driven by the flow of water.

In order to further protect the magnet I fill the casing $b$ with a cement or wax $f$ so that the magnet is entirely surrounded and embedded in the cement or wax and, therefore, any possible leakage which might pass through the casing, or any electrical effect which might be caused between it and the magnet, will be prevented. It will thus be seen that I have provided two means for protecting the magnet which act jointly and separately, one being a water-tight case made of impervious material, and the second cement or wax inclosing the magnet within the case. Other fillings than cement or wax can be used for inclosing the magnet, and any suitable impervious material may be used from which to construct the case so that I do not desire to be limited to the use of copper or the specific filling materials named.

$g$ and $h$ designate portions of the casing arranged over the magnet $a$, and $i$ designates a rotatable member connected to the registering mechanism and affected by the magnet $a$ to impart rotation to the registering mechanism. As these elements specifically form no part of my present invention, I do not deem it necessary to illustrate or describe the same with any greater exactness than that given.

What I claim and desire to secure by Letters Patent of the United States is:—

1. In a water meter in combination with driving mechanism including a magnet, of an inclosing shield for the magnet made of impervious material completely inclosing the magnet and separate therefrom.

2. In a water meter in combination with driving mechanism including a magnet, of an inclosing shield for the magnet made of impervious material completely inclosing the magnet and separate therefrom, and a filling within the shield in which the magnet is embedded.

3. In a water meter in combination with driving mechanism including a magnet, of an inclosing shield for the magnet consisting of a hermetically sealed tube of impervious material completely inclosing the magnet, and a filling within the shield in which the magnet is embedded, said filling completely inclosing the magnet.

4. In a water meter in combination with a driving mechanism including a rotatable member, adapted to be acted upon by the meter mechanism, of an impervious hermetically sealed casing supported on said rotatable member, and an operating magnet completely inclosed within said casing, the magnet being supported wholly within the casing.

In testimony whereof I have hereunto signed my name in the presence of two subscribing witnesses.

LEWIS HALLOCK NASH.

Witnesses:
M. E. McNinch,
C. G. Heylmur.